United States Patent
Kaku

(10) Patent No.: US 7,512,311 B2
(45) Date of Patent: Mar. 31, 2009

(54) DATA OUTPUT APPARATUS AND METHOD WITH MANAGED BUFFER

(75) Inventor: Junya Kaku, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 993 days.

(21) Appl. No.: 10/440,887

(22) Filed: May 19, 2003

(65) Prior Publication Data

US 2003/0215225 A1 Nov. 20, 2003

(30) Foreign Application Priority Data

May 20, 2002 (JP) ............... 2002-144059

(51) Int. Cl.
*H04N 5/78* (2006.01)
*G06F 12/00* (2006.01)
*G06F 13/00* (2006.01)

(52) U.S. Cl. .................. 386/46; 386/125; 711/100; 711/109; 711/110; 711/111; 711/112

(58) Field of Classification Search .......... 386/89, 386/125, 126; 365/189.05; 711/110
See application file for complete search history.

(56) References Cited

U.S. PATENT DOCUMENTS

| | | | | |
|---|---|---|---|---|
| 5,561,670 A | * | 10/1996 | Hoffert et al. ............ | 370/410 |
| 5,592,450 A | * | 1/1997 | Yonemitsu et al. ........ | 386/96 |
| 5,793,980 A | * | 8/1998 | Glaser et al. ............. | 709/231 |
| 5,838,876 A | * | 11/1998 | Iwamura .................. | 386/125 |
| 5,920,529 A | * | 7/1999 | Ota et al. ................. | 369/84 |
| 5,966,182 A | * | 10/1999 | Yonemitsu et al. ....... | 348/423.1 |
| 5,999,691 A | * | 12/1999 | Takagi et al. ............. | 386/46 |
| 6,247,072 B1 | * | 6/2001 | Firestone ................. | 710/53 |
| 6,332,058 B1 | * | 12/2001 | Kawakami ............... | 386/111 |
| 6,385,673 B1 | * | 5/2002 | DeMoney ................ | 710/60 |
| 6,587,641 B1 | * | 7/2003 | Maehashi et al. ........ | 386/111 |
| 6,665,751 B1 | * | 12/2003 | Chen et al. .............. | 710/52 |

(Continued)

FOREIGN PATENT DOCUMENTS

JP   2001-290700   10/2001   ............ 12/2

OTHER PUBLICATIONS

Markoff, J. "Patent Awarded to RealNetworks May Give It a Competitive Edge". In:_The New York Times_, Apr. 24, 2006.*

(Continued)

*Primary Examiner*—Thai Tran
*Assistant Examiner*—David N Werner
(74) *Attorney, Agent, or Firm*—Gerald T. Bodner

(57) ABSTRACT

A data output apparatus includes a disk drive for driving a magneto-optical disk. Compressed image data recorded on the magneto-optical disk is transferred from the magneto-optical disk to an SDRAM according to a transfer instruction set in an instruction list and then output through an expansion process by a JPEG codec. A size of the compressed image data for which the transfer instruction is set in the instruction list and which has not yet been transferred to the SDRAM, and a size of the compressed image data for which the transfer instruction is set in the instruction list and which has not yet been expanded are detected by a CPU. The CPU suspends an output of an expansion instruction to the JPEG codec when a difference between the detected sizes is below a threshold value.

9 Claims, 16 Drawing Sheets

U.S. PATENT DOCUMENTS

| | | | |
|---|---|---|---|
| 6,757,273 B1* | 6/2004 | Hsu et al. | 370/349 |
| 6,959,141 B1* | 10/2005 | Ichikawa et al. | 386/95 |
| 6,985,932 B1* | 1/2006 | Glaser et al. | 709/219 |
| 7,054,500 B1* | 5/2006 | Lillevold | 382/260 |
| 2002/0015447 A1* | 2/2002 | Zhou | 375/240.25 |
| 2002/0040403 A1* | 4/2002 | GOLDHOR et al. | 709/231 |
| 2002/0122658 A1* | 9/2002 | Fukuda et al. | 386/95 |
| 2002/0131765 A1* | 9/2002 | DeKeyser et al. | 386/70 |
| 2003/0198184 A1* | 10/2003 | Huang et al. | 370/231 |
| 2004/0139215 A1* | 7/2004 | Lanphear | 709/232 |

OTHER PUBLICATIONS

Monkey, S. "Streaming Patent Buoys Real Networks". Slashdot [online], Apr. 24, 2006 [retrieved Aug. 17, 2007]. Retrieved from the Internet <URL: http://yro.slashdot.org/article.pl?sid=06/04/24/2016226>.*

* cited by examiner

| CHUNK NUMBER | OFFSET | SIZE (byte) |
|---|---|---|
| 0 | aofst[0] | asz[0] |
| 1 | aofst[1] | asz[1] |
| 2 | aofst[2] | asz[2] |
| 3 | aofst[3] | asz[3] |
| 4 | aofst[4] | asz[4] |
| ⋮ | ⋮ | ⋮ |

| FRAME NUMBER | OFFSET | SIZE (byte) |
|---|---|---|
| 0 | mofst[0] | msz[0] |
| 1 | mofst[1] | msz[1] |
| 2 | mofst[2] | msz[2] |
| 3 | mofst[3] | msz[3] |
| 4 | mofst[4] | msz[4] |
| ⋮ | ⋮ | ⋮ |

| MAIL NUMBER | OPERATION | FILE ADDRESS | SDRAM ADDRESS | SIZE (byte) | CLASSIFICATION NUMBER |
|---|---|---|---|---|---|
| 0 | SEEK | aofst[chk]+acnt | — | — | 0 |
| 1 | WRITE | — | apreptr | asz[chk]-acnt | 2 |
| 2 | SEEK | mofst[prefrm] | — | — | 0 |
| 3 | WRITE | — | mpreptr | msz[prefrm] | 1 |
| ----- | ----- | ----- | ----- | ----- | ----- |

DATA OUTPUT APPARATUS AND METHOD WITH MANAGED BUFFER

BACKGROUND OF THE INVENTION

1. Field of the Invention

The present invention relates to a data output apparatus utilized for reproducing motion image data. More specifically, the present invention relates to a data output apparatus for outputting data stored in a recording medium via a buffer memory.

2. Description of the Prior Art

If data read from a recording medium is temporarily stored in a buffer memory, it is possible to successively output the data even if the data is intermittently read from the recording medium. Furthermore, by renewing an address of the buffer memory in a ring form, i.e., by utilizing the buffer memory as a ring buffer, it is possible to output the data exceeding a capacity of the buffer memory.

However, if addresses of the buffer memory are not adequately managed, a writing address is overtaken by the reading address, and whereby, data processing is broken down.

SUMMARY OF THE INVENTION

Therefore, it is a primary object of the present invention to provide a data output apparatus capable of preventing a writing address from being overtaken by a reading address in a buffer memory.

According to the invention, a data output apparatus which outputs data stored in a recording medium via a first buffer memory, comprises: a setter for setting a transfer instruction of the data in an instruction list: a transferer for transferring the data from the recording medium to the first buffer memory according to the setting of the instruction list; a reader for reading the data from the first buffer memory; a first detector for detecting a first size being a size of data for which the transfer instruction is set in the instruction list and which has not yet been transferred by the transferer; a second detector for detecting a second size being a size of data for which the transfer instruction is set in the instruction list and which has not yet been read by the reader; and a disabler for disabling the reader when a difference between the first size and the second size is below a threshold value.

When the data stored in the recording medium is output via the first buffer memory, the transfer instruction of the data is first set in the instruction list by the setter. The data is transferred from the recording medium to the first buffer memory by the transferer according to the setting of the instruction list. The data transferred to the first buffer memory is read by the reader.

Herein, the first size being a size of the data for which the transfer instruction is set in the instruction list and which has not yet been transferred by the transferer is detected by the first detector, and the second size being a size of the data for which the transfer instruction is set in the instruction list and which has not yet been read by the reader is detected by the second detector. The reader is disabled by the disabler when the difference between the first size and the second size is below the threshold value.

The difference between the first size and the second size is a size of the data which has been transferred to the first buffer memory and which has not yet been read by the reader. The reader is disabled when such the size is below the threshold value, and whereby, it is possible to avoid an incident that a writing address is overtaken by a reading address in the first buffer memory.

In a case the data is a plurality of screens of image data, the threshold value preferably corresponds to a size of an image data to be read next by the reader. Thus, it is possible to efficiently use a capacity of the first buffer memory.

In a case the recording medium is a disk medium, the data is reproduced from the disk medium by a movable reproducing member. The disk medium requires the seek operation by the movable reproducing member, the transfer is suspended during the seek operation, and therefore, the difference between the first size and the second size can be widely changed depending upon a recording state of the data. In this case, an advantage caused by setting the size of data to be read next in the threshold value by the reader conspicuously appears.

In a case the image data is encoded image data, the encoded image data read by the reader is preferably decoded by the decoder, decoded image data is written to a second buffer memory by a writer, and the decoded image data stored in the second buffer memory is output to a monitor by an outputter. Thus, while the reader is disabled, an image of the same screen is continued to be displayed on the monitor.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 4 is an illustrative view showing an offset table of audio data;

FIG. 5 is an illustrative view showing an offset table of image data;

FIG. 6 is an illustrative view showing an instruction list;

DETAILED DESCRIPTION OF THE PREFERRED EMBODIMENTS

Figure 1:
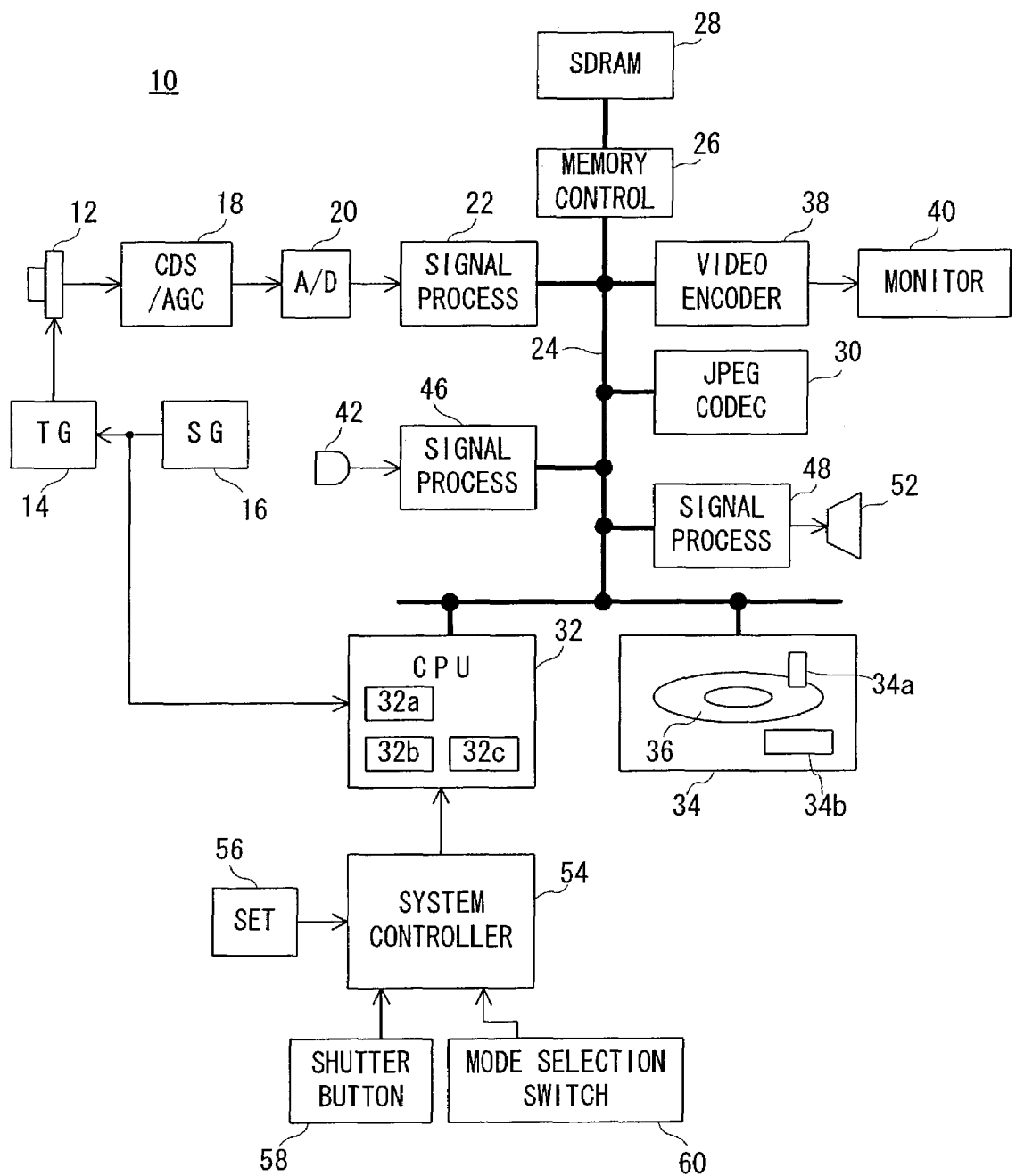
FIG. 1 is a block diagram showing one embodiment of the present invention.

Referring to FIG. 1, a digital camera 10 of this embodiment includes an image sensor 12. The image sensor 12 has a color filter (not shown) on its front surface, and an optical image of an object is irradiated on the image sensor 12 via the color filter.

When a mode selection switch 60 is switched to a "camera" side, a state signal corresponding thereto is applied to a CPU 32 from a system controller 54. The CPU 32 instructs a TG (Timing Generator) 14 to repeatedly perform exposure and thin-out reading so as to display a real time motion image (through image) of the object on a monitor 40. The TG 14 generates a timing signal on the basis of a vertical synchronization signal and a horizontal synchronization signal output from an SG (Signal Generator) 16 so as to perform the exposure and the thin-out reading on the image sensor 12. Consequently, a low resolution camera signal of each frame is output from the image sensor 12 at every $1/30$ seconds.

The output camera signal is subjected to a well-known noise removal and a level adjustment in a CDS/AGC circuit 18 and then, converted into camera data of being a digital signal by an A/D converter 20. A signal processing circuit 22 performs processes such as color separation, white balance adjustment, YUV conversion and etc. on the camera data output from the A/D converter 20 so as to generate YUV data. Since the image sensor 12 outputs the camera signal of each frame at every $1/30$ seconds, the YUV data (still image data) of each frame is also output at every $1/30$ seconds from the signal processing circuit 22. The signal processing circuit 22 outputs to a memory control circuit 26 the still image data thus generated together with a writing request.

Figure 2:
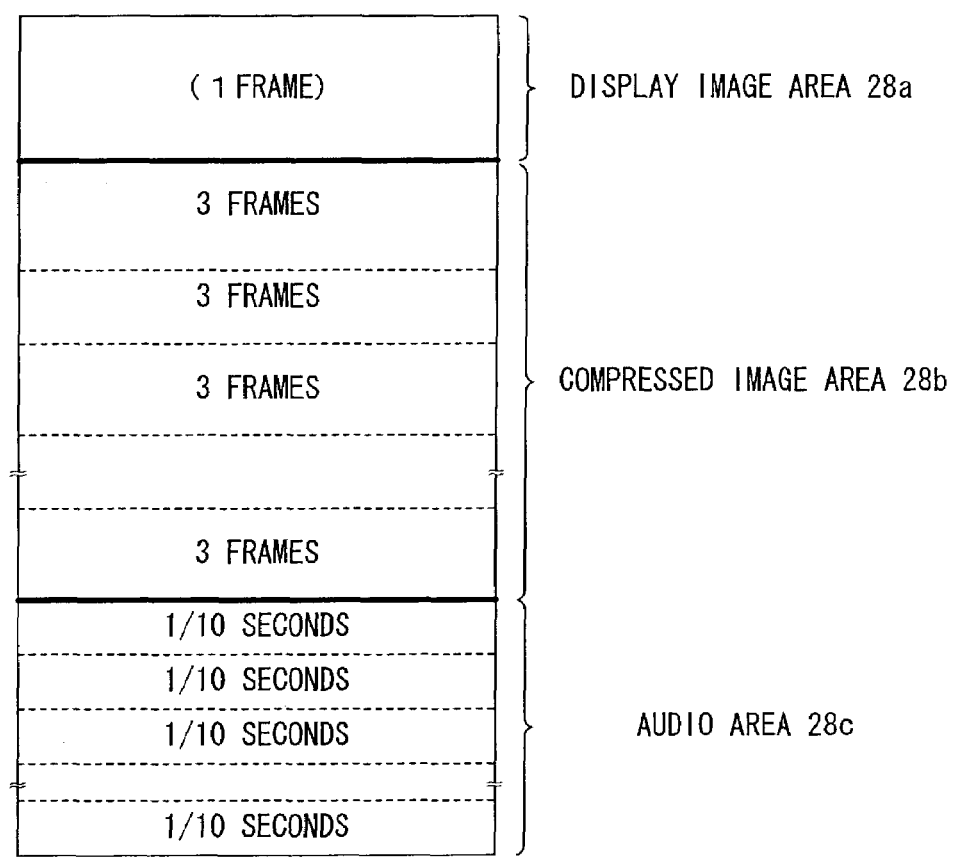
FIG. 2 is an illustrative view showing a mapping state of an SDRAM.

The memory control circuit 26 writes the still image data to an SDRAM 28 in response to the writing request. The SDRAM 28 is formed with a display image area 28a shown in FIG. 2, and the still image data is written to the display image area 28a. The display image area 28a has a capacity of only one frame, and therefore, the still image data of each frame is renewed at every $1/30$ seconds. On the other hand, a video encoder 38 outputs a reading request to the memory control circuit 26 at every $1/60$ seconds, and whereby, the memory control circuit 26 reads the still image data from the display image area 28a at every $1/60$ seconds. The read still image data of each frame is applied to the video encoder 38 via a bus 24. The video encoder 38 converts the applied still image data of each frame into a composite image signal in an NTSC format and applies the converted composite image signal to the monitor 40. Consequently, a through image of the object is displayed on the monitor 40.

When an operator operates the shutter button 58, a state signal corresponding thereto is applied from the controller 54 to the CPU 32. The CPU 32 generates an image compression instruction and an audio processing instruction at every $1/30$ seconds so as to compress the still image data and fetch an audio signal. The image compression instruction is applied to a JPEG codec 30, and the audio processing instruction is applied to a signal processing circuit 46.

The JPEG codec 30 outputs a reading request to the memory control circuit 26 in response to the image compression instruction. The still image data stored in the display image area 28a of the SDRAM is read at every $1/30$ seconds by the memory control circuit 26. The read still image data is applied to the JPEG codec 30 via the bus 24 so as to be subjected to JPEG compression. The JPEG codec 30 requests, every time one frame of compressed image data is generated, writing of the compressed image data to the memory control circuit 26, and the memory control circuit 26 writes the compressed image data to a compressed image area 28b shown in FIG. 2 in response to the request.

On the other hand, the signal processing circuit 46 fetches an audio signal from a microphone 42 in response to the audio processing instruction. The signal processing circuit 46 generates monophonic audio data of 1 byte=8 bits by performing an A/D conversion process (sampling frequency: 7990 Hz) on the fetched audio signal and outputs the audio data to the memory control circuit 26 together with a writing request. Since the audio processing instruction is applied at ever $1/30$ seconds, the audio data of $1/30$ seconds, i.e., 266 bytes is output to the memory control circuit 26. The memory control circuit 26 writes the audio data of 266 bytes to an audio area 28c shown in FIG. 2 in response to the writing request.

The CPU 32 also requests the memory control circuit 26 to read the data. The memory control circuit 26 alternately reads the audio data of $1/10$ seconds and the compressed image data of 3 frames in response to the applied request, and records the read data to a magneto-optical disk 36 via a disk drive 34.

It is noted that the magneto-optical disk 36 is a detachable recording medium and is recordable by use of a magnetic head 34a and an optical pick up 34b when attached to the disk drive 34.

Figure 3:
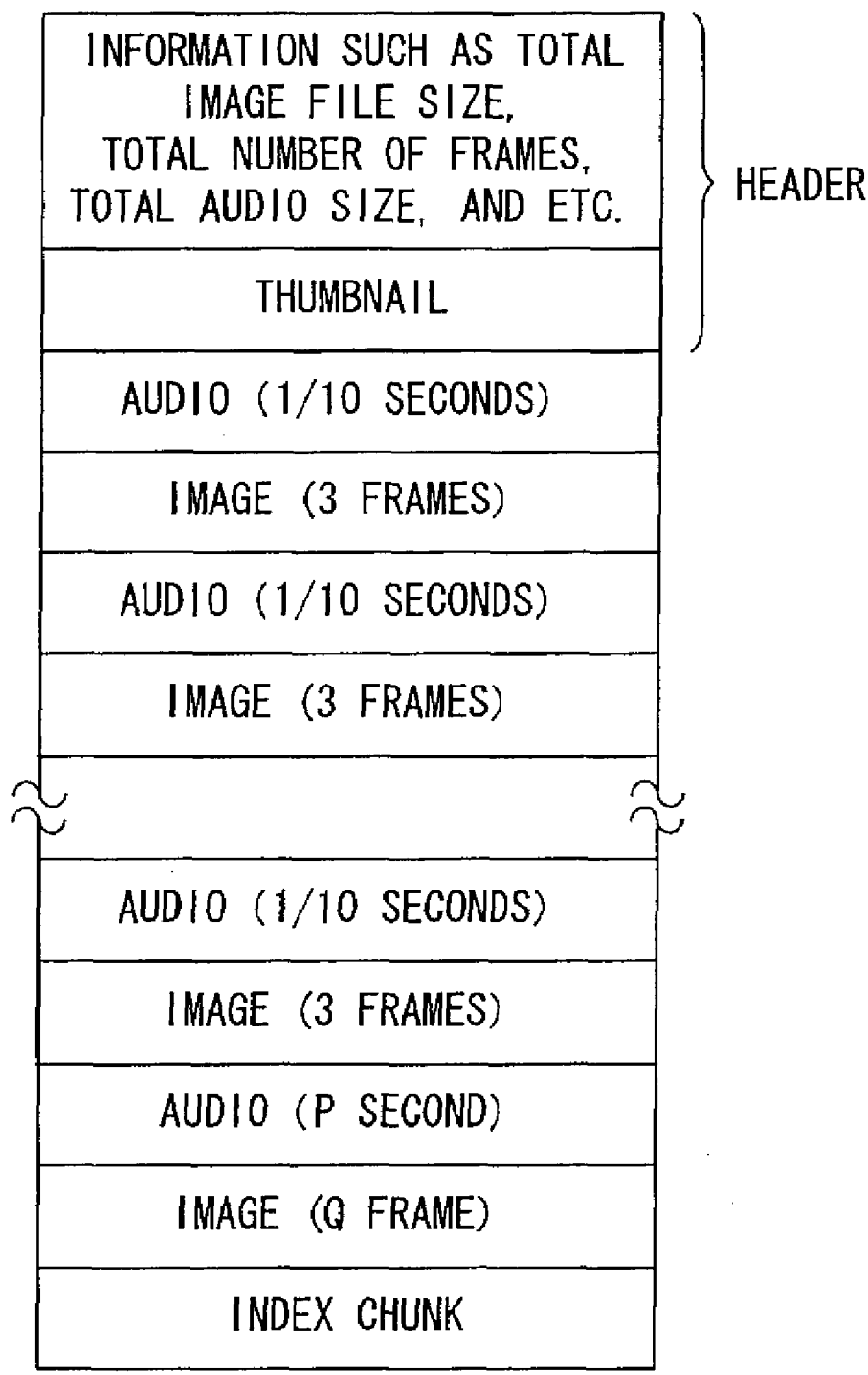
FIG. 3 is an illustrative view showing a Quick Time file.

A file header in a QuickTime format is formed in the magneto-optical disk 36 in response to a first operation of a shutter button 58. The audio data and the compressed image data read from the SDRAM 28 are written subsequent to the file header. Thus, an audio chunk formed by the audio data of $1/10$ seconds and an image chunk formed by the compressed image data of 3 frames are alternately formed as shown in FIG. 3. One audio chunk and a successive one image chunk are corresponding with each other. A start address of each audio chunk and the start address of each frame of the compressed image data are written to an index chunk formed at an end of the file. By such the index chunk, the audio data is managed at every $1/10$ seconds, and the compressed image data is managed at every 1 frame.

When the shutter button 58 is turned off, the CPU 32 finishes outputting the image compression instruction directed to the JPEG codec 30 and the audio processing instruction directed to the signal processing circuit 46. That is, the CPU 32 finishes a data writing process to the SDRAM 28. It is noted that a recording process is finished at a time all the data in the SDRAM 28 is recorded on the magneto-optical disk 36.

It is noted that an FAT system of MS-DOS is adopted as a file management method in the magneto-optical disk 36, and the QuickTime file is dispersedly recorded in a cluster unit.

When the mode selection switch 60 is switched to a "reproduction" side and a set key 56 is operated, the QuickTime file recorded on the magneto-optical disk 36 as above-described manner is reproduced. First, the CPU 32 gives access to the magneto-optical disk 36 via the disk drive 34 (by the magnetic head 34a) and reads the audio data and the compressed image data within the QuickTime file from addresses next to the file header. The CPU 32 further applies the read audio data and compressed image data to the memory control circuit 26 together with a writing request. The audio data and the image data area are written to the SDRAM 28 by the memory control circuit 26. Since the QuickTime file is formed as shown in FIG. 3, the audio data of $1/10$ seconds and the compressed image data of 3 frames are alternately read from the QuickTime file. Then, the audio data is successively written to a head of the audio area 28c shown in FIG. 2, and the compressed image data is successively written to a head of the compressed image area 28b shown in FIG. 2.

When an expansion instruction is applied from the CPU 32, the JPEG codec 30 requests the memory control circuit 26 to read one frame of the compressed image data and expands in a JPEG format the compressed image data read by the memory control circuit 26 from the compressed image area 28b. The JPEG codec 30 further applies to the memory control circuit 26 the expanded image data together with a writing request. The expanded image data is written to the display image area 28a shown in FIG. 2 by the memory control circuit 26. The CPU 32 generates the expansion instruction at every 1/30 seconds, and the JPEG codec 30, every time the expansion instruction is applied, expands the compressed image data of the successive frames in the above-described manner. Thus, the expanded image data on the display image area 28a is renewed at every 1/30 seconds.

Each frame of the expanded image data stored in the display image area 28a is read twice on the basis of a reading request output at every 1/60 seconds from the video encoder 38. The reading is performed by the memory control circuit 26, and the video encoder 38 converts the read expanded image data into a composite image signal. The converted composite image signal is applied to the monitor 40, and whereby, a motion image having a normal speed is reproduced on the screen.

The CPU 32 further applies a reproduction instruction of the audio data to the signal processing circuit 48 in response to a system clock. The signal processing circuit 48, every time the reproduction instruction is applied, applies a reading request of 1 sample (=1 byte) of the audio data to the memory control circuit 26 and performs a predetermined reproduction process on the audio data read from the audio area 28c by the memory control circuit 26. An audio signal on which the reproducing process is performed is output from a speaker 52.

It is noted that the SDRAM 28 is operated as the ring buffer in both recording and reproducing modes. The addresses of access destinations are renewed at the compressed image area 28b and the audio area 28c in a ring format or a circular manner. Therefore, it is possible to record/reproduce the compressed image data exceeding a capacity of the compressed image area 28b and the audio data exceeding a capacity of the audio area 28c.

Figure 14:
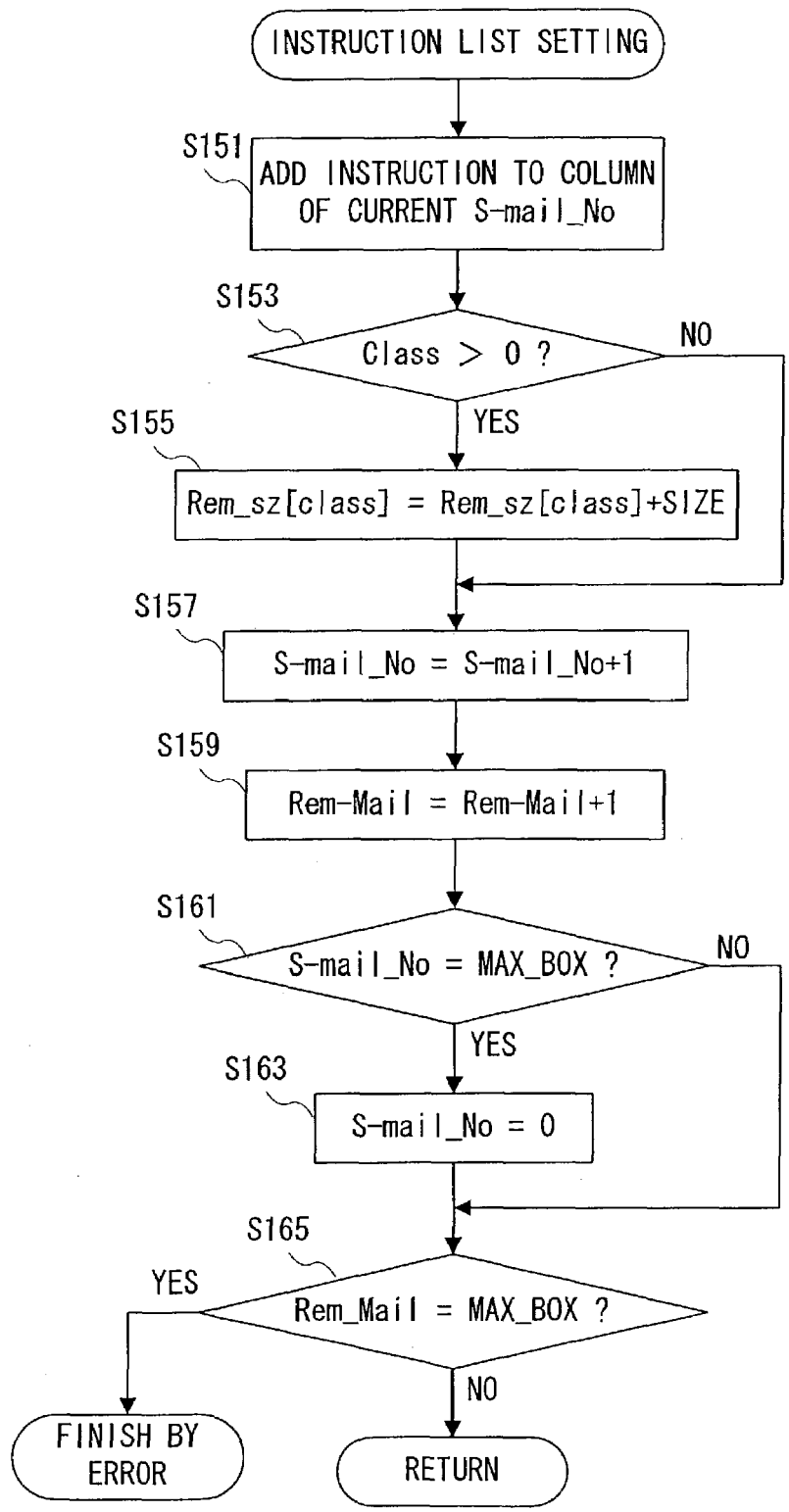
FIG. 14 is a flowchart showing another part of the operation of FIG. 1 embodiment.
Figure 15:
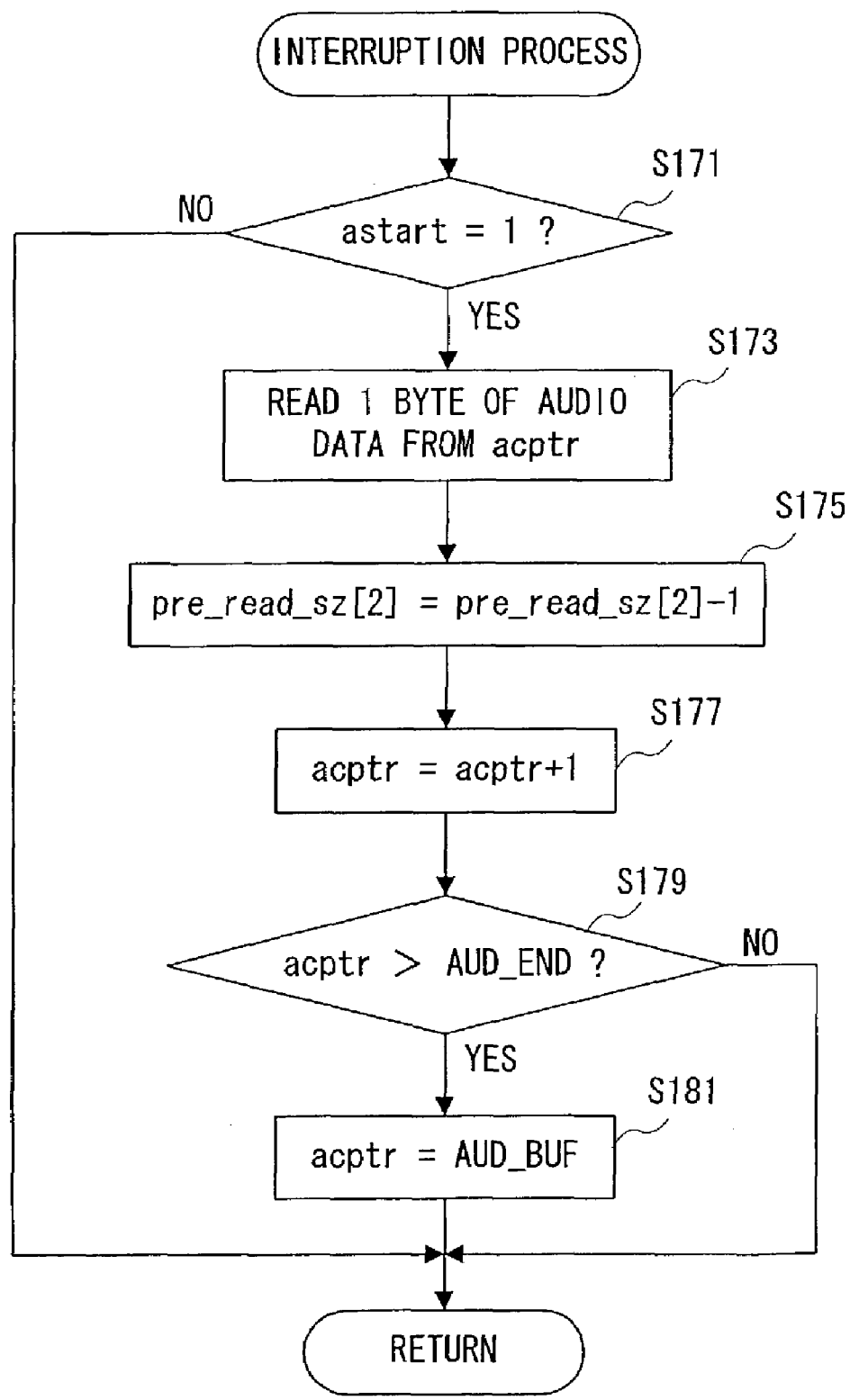
FIG. 15 is a flowchart showing the other part of the operation of FIG. 1 embodiment.
Figure 16:
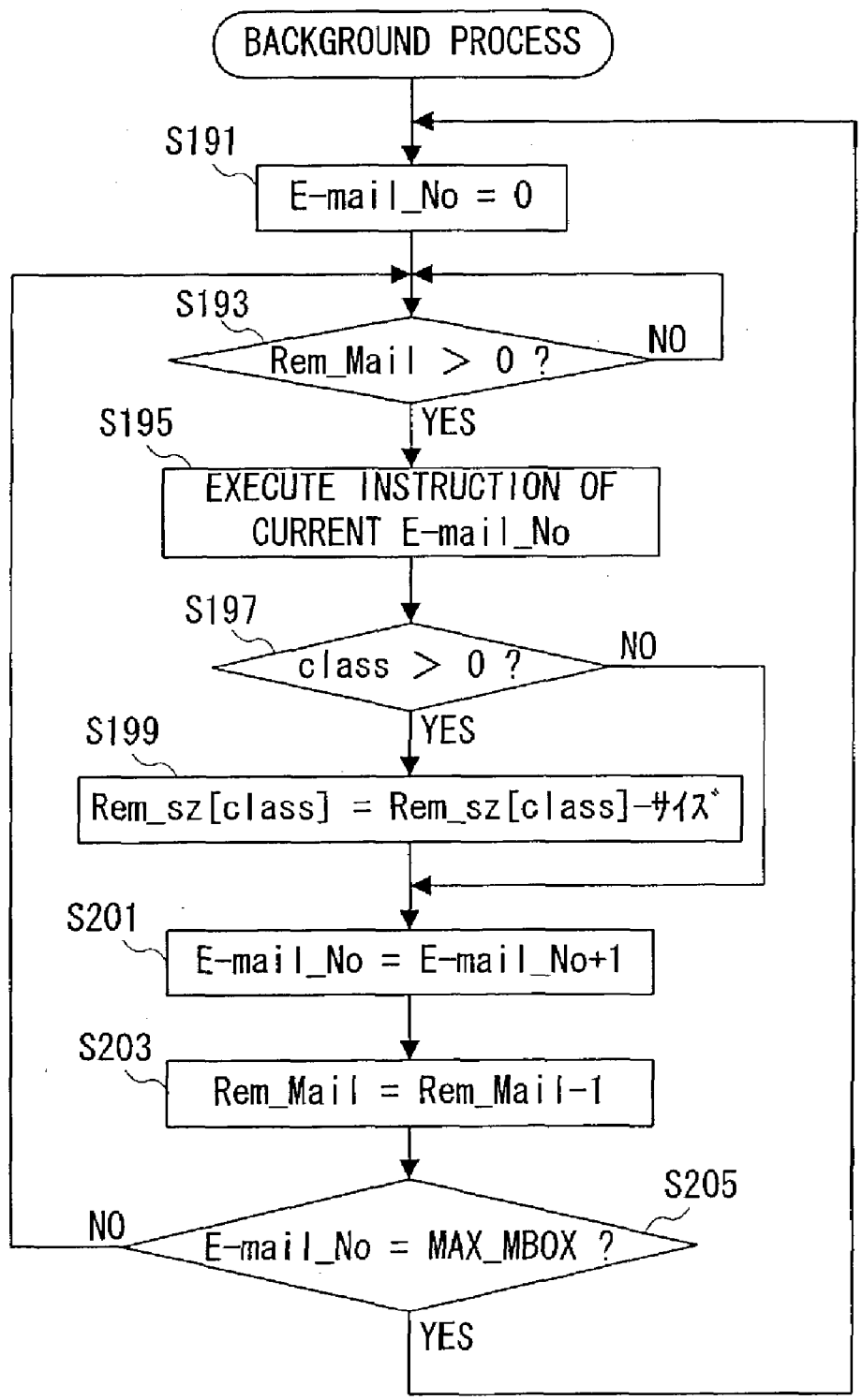
FIG. 16 is a flowchart showing a further part of the operation of FIG. 1 embodiment.

When the mode selection switch 60 is switched to the "reproduction" side, and the set key 56 is operated, the CPU 32 executes a reproduction process shown in FIG. 7 to FIG. 15 and a background process shown in FIG. 16. That is, the CPU 32 is installed with a multitask OS (real time OS) such as the μiTRON, and executes two tasks of the reproducing process and the background process in parallel. It is noted that a control program corresponding to a flowchart shown in FIG. 7 to FIG. 16 is stored in a ROM 62.

Herein, the process of the CPU 32 uses variables shown in tables 1 to 3. The variables relating to the audio, the variables relating to the image and the variables relating to the background process are listed in the tables 1 to 3, respectively.

TABLE 1

| | |
|---|---|
| chk | chunk number |
| aofst [chk] | Offset |
| asz [chk] | chunk size |
| acnt | count value of audio data |
| AMAX | total number of bytes of audio data |
| AUD_BUF | head address of audio area |
| AUD_END | end address of audio area |
| apreptr | audio writing address |
| acptr | audio reproducing address |
| dm | remaining capacity value |

TABLE 1-continued

| | |
|---|---|
| astart | interruption permission flag |
| aflg | audio writing prohibition flag |
| pre_read_sz [class] | unprocessed data size (audio: class = 2) |

TABLE 2

| | |
|---|---|
| prefrm | writing frame number |
| frm | reproducing frame number |
| mofst [prefrm] | Offset |
| msz [prefrm] | frame size |
| MFMAX | total number of frames of image data |
| MOV_BUF | head address of compressed image area |
| MOV_END | end address of compressed image area |
| mpreptr | image writing address |
| mcptr | image reproducing address |
| decflg | image expansion permission flag |
| pre_read_sz [class] | unprocessed data size (image: class = 1) |

TABLE 3

| | |
|---|---|
| S-mail_No | setting mail number |
| E-mail_No | executing mail number |
| MAX_BOX | total number of settable mails |
| sz_min | minimum data size |
| Rem_Mail | number of unprocessed mails |
| Rem_sz [class] | unprocessed data size |

Referring to the table 1, the chk is the chunk number of the audio chunk, the aofst [chk] is the offset from a head address of the QuickTime file to a head address of the noted audio chunk, and the asz [chk] is the size (number of bytes) of the noted audio chunk. The acnt is the count value of the audio data indicated by the number of bytes, and the AMAX is a total number of bytes of the audio data stored in the QuickTime file. The AUD_BUF and AUD_END are respectively the head address and the end address of the audio area 28c. The apreptr is the writing address of the audio area 28c, the acptr is the reading (reproducing) address of the audio area 28c, and the dm is the remaining capacity value of the audio area 28c. The astart is a flag to indicate whether or not an interruption process is permitted, and the aflag is a flag to indicate whether or not the writing to the audio area 28c is permitted. The pre_read_sz [class] is a size (byte) of the audio data for which a transfer instruction to the SDRAM 28 is set in an instruction list 32c shown in FIG. 6 and on which a process by the signal processing circuit 48 has not yet been performed. In a case of the audio data, the class for indicating a classification is made "2".

As to the table 2, the prefrm is the frame number of the compressed image data to be written to the compressed image area 28b, and the frm is the frame number of the compressed image data to be read (reproduced) from the compressed image area 28b. The mofst [prefrm] is the offset from the head address of the QuickTime file to a head address of the compressed image data of the noted frame, the msz [prefrm] is the size of the compressed image data of the noted frame, and the MFMAX is the total number of the frames of the compressed image data stored in the QuickTime file. The MOV_BUF and the MOV_END are the head address and the end address of the compressed image area 28b, respectively, and the mpreptr is a writing address of the compressed image area 28b and the mcptr is a reading (reproducing) address of the compressed image area 28b. The decflg is a flag to indicate whether or not an expansion process of the compressed image data is permitted. The pre_read_sz [class] is a size (byte) of the compressed image data for which the transfer instruction to the SDRAM 28 is set in the instruction list 32c and on which the expansion process by the JPEG codec 30 has not yet been performed. In a case of the image data, the class is made "1".

Referring to FIG. 3, the S-mail_No is a mail number indicative of a writing destination when setting an instruction in the instruction list 32c, the E-mail_No is a mail number indicative of a reading destination when executing the instruction set in the instruction list 32c. The MAX_BOX is the total number of the mails (instruction) settable in the instruction list 32c, and the Rem_Mail is the number of the mails which is set in the instruction list 32c and which has not yet been processed. The Rem_sz [class] is a size (byte) of the data for which the transfer instruction to the SDRAM 28 is set in the instruction list 32c and on which writing to the SDRAM 28 has not yet been performed. As described above, the class is made "1" as to the image data, and the class is made "2"as to the audio data.

Figure 7:
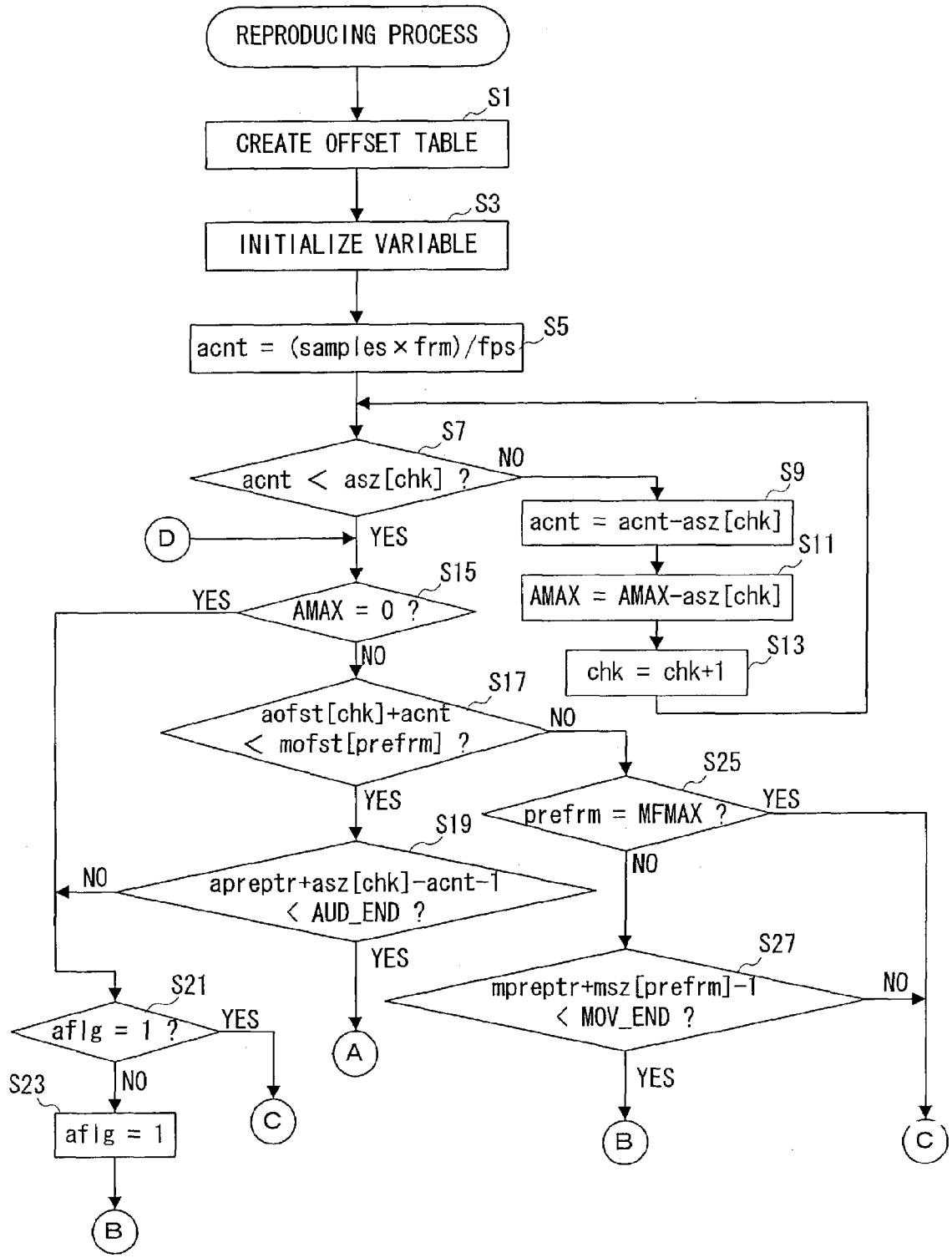
FIG. 7 is a flowchart showing a part of an operation of FIG. 1 embodiment.

Referring to FIG. 7, in a step S1, an audio offset table 32a shown in FIG. 4 and an image offset table 32b shown in FIG. 5 are created on the basis of the address information written to the index chunk shown in FIG. 3. The audio offset table 32a is written with the offset aofst [chuk] and the chunk size asz [chk] of each audio chunk, and the image offset table 32b is written with the offset mofst [prefrm] and the data size msz [prefrm] of each frame of the compressed image data.

Next, the variables of every kind are initialized in a step S3. More specifically, as to the audio data, the chunk number is set to "0", the audio writing address apreptr and the audio reproducing address acptr are made to coincide with the head address AUD_BUF of the audio area 28c, the interruption permission flag astart and the audio writing prohibition flag aflg are set to "0", and the unprocessed data size pre_read_sz [2] is set to "0". As to the image data, the reproducing frame number frm is made to coincide with the writing frame number prefrm, the image reproducing address mcptr and the image writing address mpreptr are made to coincide with the head address MOV_BUF of the compressed image area 28b, the image expansion permission flag decflg is set to "0", and the unprocessed data size pre_read_sz [1] is set to "0". As to the instruction list 32c, the setting mail number S-mail_No, the number of the unprocessed mail Rem_mail, the unprocessed data size Rem_sz [1] of the audio, the unprocessed data size Rem_sz [2] of the image are set to "0".

An equation 1 is operated so as to require the count value acnt of the audio data in a step S5, and the calculated count value acnt is compared with the audio chunk size asz [chk] corresponding to the current chunk number chk in a following step S7. Then, if acnt≧asz [chk], the current audio chunk size asz [chk] is subtracted from the calculated count value acnt in a step S9, the current audio chunk size asz [chk] is subtracted from the total number of bytes AMAX of the audio data in a step S11, and the chunk number chk is incremented in a step S13. After the process in the step S13, the process returns to the step S5.

$$acnt=(sample \times frm)/fps \quad \text{(equation 1)}$$

sample: audio data amount (byte) corresponding to 1 frame
fps: frame rate of an motion image The address of the audio data corresponding to the still image of the frame currently displayed on the monitor 40 (current frame) is required by the equation 1. It is noted that the address required herein is an address on the assumption that the audio data is continuous from the top, and it is not neccessarily correspondent with the address on the Quick-Time file. Therefore, the process from the step S9 to the step S13 is repeated until it is determined to be acnt<asz [chk] in the step S7, and whereby, it becomes clear that in what audio chunk and in what byte a desired address exists.

When acnt<asz [chk] is determined in the step S7, a value of the total number of bytes AMAX is identified in a step S15. The process in the step S15 is a process to determine whether or not the transfer instructions of all the audio data are completed to be set in the instruction list 32c. If the count value acnt indicates the end address of the end audio chunk, the total number of bytes AMAX indicates "0". At this time, it is considered that setting of the transfer instructions of all the audio data is completed, and then the process proceeds to a step S21. A state of the audio writing prohibition flag aflg is determined in the step S21, and if aflg=0, aflg=1 is made in a step S23 and then, the process proceeds to a step S43 while if aflg=1, the process directly proceeds to a step S57. That is, if the audio writing prohibition flag aflg indicates "0", it is considered that although all the setting of the transfer instruction directed to the audio data is completed, setting of the transfer instruction directed to the compressed image data has not yet been completed, and then, the process proceeds to the step S43. At this time, aflg=1 is made in the step S23, so that "YES" is determined in the process of the step S21 next time.

It is determined whether or not an equation 2 is established in a step S17. The step S17 is a process to determine whether the transfer instruction which is to be set next is directed to the audio data or the compressed image data.

$$aofst[chk]+acnt<mofst[prefrm] \quad \text{(equation 2)}$$

As described later, when the transfer instruction for 1 chunk of the audio data is set in the instruction list 32c or the transfer instruction for 3 frames of the compressed image data is set in the instruction list 32c, a relationship of large and small between "aofst [chk]+cant" and "mofst [prefrm]" is inverted. Therefore, it is possible to determine whether the transfer instruction which is to be set next is directed to the audio data or the compressed image data depending upon whether or not the equation 2 is established. In a case the transfer instruction which is to be set next is directed to the audio data, "YES" is determined in the step S17, and it is determined whether or not an equation 3 is established in a step S19.

$$apreptr+asz[chk]-acnt-1<AUD\_END \quad \text{(equation 3)}$$

The audio data size from the address indicated by the current count value acnt to the end address of the audio chunk to which the address belongs is "asz [chk]−acnt". In a step S19, it is determined whether or not the audio data corresponding to "asz [chk]−acnt" can be stored between the current audio writing address apreptr to the end address of the audio area 28c. It is noted that the reason why "−1" is adopted in the equation 3 is that the address of the audio area 28c starts from "0".

If "NO" is determined in the step S19, it is considered that although the setting of the transfer instruction of all the audio data has not yet been completed, the transfer instruction cannot be set due to an insufficient capacity of the audio area 28c, and then, the process proceeds to the step S21. On the other hand, if "YES" is determined in the step S19, it is considered the capacity of the audio area 28c is sufficient, and then, the process proceeds to a step S29.

In the step S29, a classification "0", an operation "head seek" and a file address "aofst [chk]+acnt" are set in the instruction list 32c shown in FIG. 6, and in a following step S31, the classification "2", the operation "write", an SDRAM address "apreptr" and a size "asz [chk ]−acnt" are set in the instruction list 32c. It is noted that the classification "0" means the instruction is an instruction other than the data transfer instruction.

Since the transfer instruction of the audio data corresponding to "asz [chk]−acnt" is set in a step S31, "asz [chk]−acnt" is added to the unprocessed data size pre_read_sz [2] in a step S33, "asz [chk]−acnt" is added to the current writing address apreptr in a step S35, and the size of the current audio chunk "asz [chk]" is subtracted from the total number of bytes AMAX in a step S37. Succeedingly, the count value acnt is made "0" in a step S39, the chunk number chk is incremented in a step S41, and then, the process returns to the step S15.

It is noted that the count value acnt is a variable utilized for designating an address of an access destination when reproduction is started from the middle of the audio chunk. Therefore, when the transfer setting of the audio data belonging to the audio chunk is completed, the count value acnt becomes "0" and senseless.

In each of the above-described steps S29 and S31, and after-mentioned steps S43, S45, S103, S107, S111, S115, S129 and S131, a subroutine shown in FIG. 14 is processed. First, a desired instruction (command) is added to a column corresponding to the current setting mail number S-mail_No in the instruction list 32c in a step S151. A desired classification is determined in a step S153, and if the desired classification is "0", the process directly proceeds to a step S157 while if the desired classification is "1" or "2", the process proceeds to the step S157 through a step S155. In a case the desired classification is "1", a desired size is added to the unprocessed data size Rem_sz [1] in the step S155. In a case the desired classification is "2", the desired size is added to the unprocessed data size Rem_sz [2] in the step S155.

The setting mail number S-mail_No is incremented in the step S157, and the number of the unprocessed mails Rem_Mail is incremented in a step S159. The incremented setting mail number S-mail_No is compared with the total number of the settable mails MAX_BOX in a step S161. Herein, if S-mail_No<MAX_BOX, the process directly proceeds to a step S165 while if S-mail_No=MAX_BOX, the setting mail number S-mail_No is returned to "0" in a step S163 and then, the process proceeds to the step S165. In the step S165, it is determined whether or not the number of the unprocessed mails REM-mail is equal to the total number of the mails MAX_BOX, and if "NO" is determined, the process is directly restored to a hierarchical upper routine while if "YES", the process is forcedly finished due to an occurrence of an error.

Figure 8:
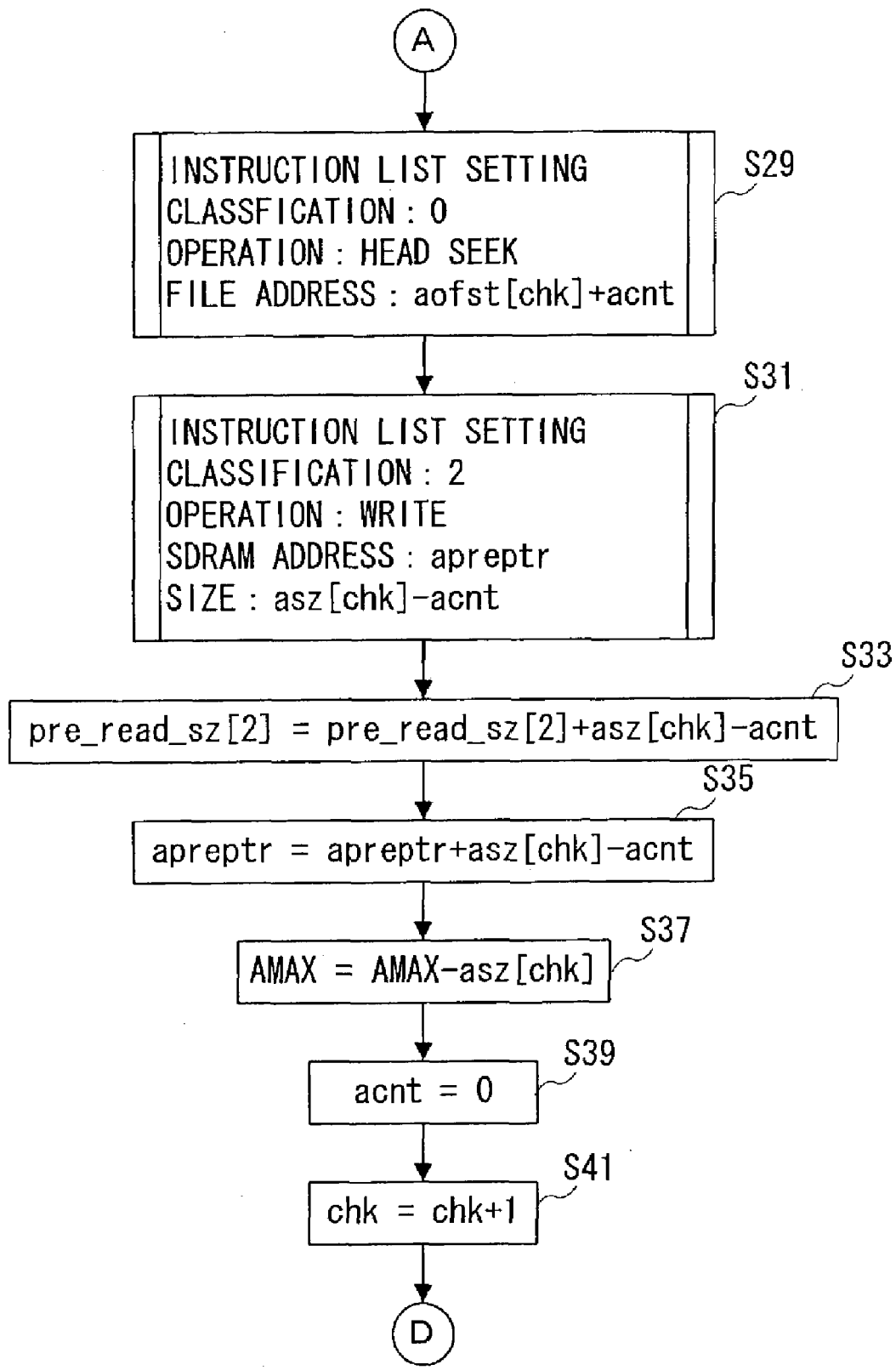
FIG. 8 is a flowchart showing another part of the operation of FIG. 1 embodiment.
Figure 9:
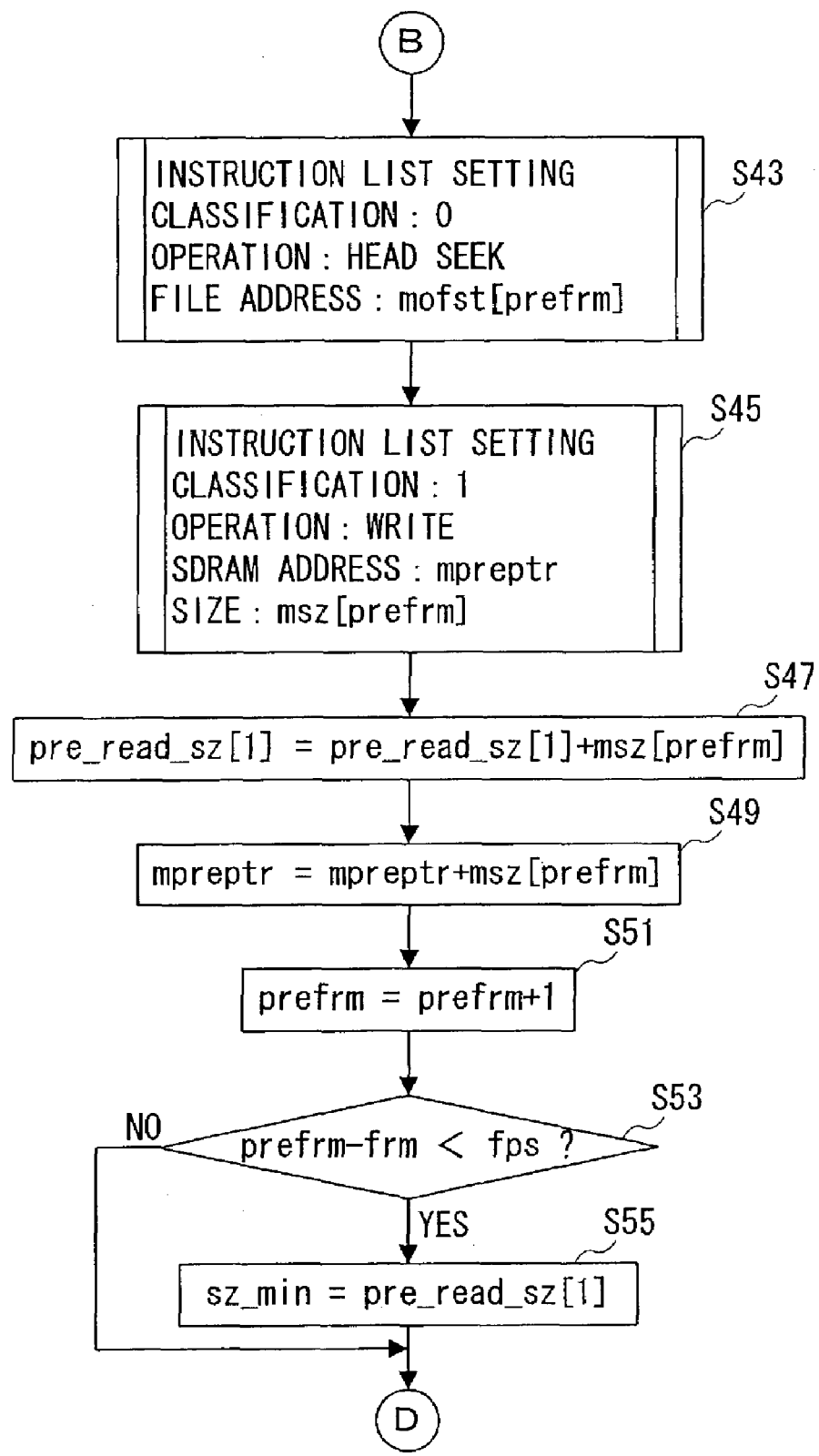
FIG. 9 is a flowchart showing the other part of the operation of FIG. 1 embodiment.

When the total number of bytes AMAX becomes "0" by a renewal process in a step S37 shown in FIG. 8, "YES" is determined in the step S15 shown in FIG. 7 and then, the process proceeds to the step S21. When the total number of bytes AAM exceeds "0" even after the renewal process in the step S37, "NO" is determined in the step S17 and then, the process proceeds to a step S25. That is, since the equation 2 is not established due to the renewal of the chunk number chk in the step S41, the process proceeds to the step S25. In the step S25, the frame number prefrm of the compressed image data to be written to the compressed image area 28b is compared with the total number of frames MFMAX. Then, if prefrm=MFMAX, the process proceeds to a step S61 while if prefrm<MFMAX, it is determined whether or not an equation 4 is established in a step S27.

$$mpreptr+msz[prefrm]-1<MOV\_END \quad \text{(equation 4)}$$

In the step S27, it is determined whether or not the 1 frame of the compressed image data corresponding to "msz [prefrm]" can be stored between the current image writing address mpreptr and the end address of the compressed image area 28b.

If the equation 4 is not satisfied, the process proceeds to the step S57 in the same manner as prefrm=MFMAX is determined. On the other hand, if the equation 4 is satisfied, the process proceeds to the step S43 so as to set the classification "0", the operation "head seek", and the file address "mofst [prefrm]" in the instruction list 32c. Succeedingly, the classification "1", the operation "write", the SDRAM address "mpreptr" and the size "msz [prefrm]" are set in the instruction list 32c in a step S45.

The size "msz [prefrm]" is added to the unprocessed data size pre_read_sz [1] in a step S47, the size "msz [prefrm]" is added to the current image writing address mpretpr in a step S49, and the current writing frame number prefrm is incremented in a step S51. Thereafter, it is determined whether or not an equation 5 is established in a step S53, and if "NO", the process directly returns to the step S15 while if "YES", the minimum data size sz_min is made to coincide with the unprocessed data size pre_read_sz [1] and then, the process returns to the step S15.

$$prefrm-frm<fps \quad \text{(equation 5)}$$

The equation 5 is established when a difference between the writing frame number prefrm and the reproducing frame number (frame number of the displayed still image) frm is below the frame rate of "30". Therefore, as far as the number of the frames of the compressed image data for which the transfer instruction to the SDRAM 28 is set in the instruction list 32c and on which the expansion process by the JPEG codec 30 has not yet been performed is below "30", the minimum data size sz_min is changed according to the unprocessed data size pre_read_sz [1] (=the size of the compressed image data for which the transfer instruction is set in the instruction list 32c and on which the expansion process by the JPEG codec 30 has not yet been performed). However, when the setting process to the instruction list 32c is executed at high speed, and the above-described difference becomes equal to or more than "30", the renewal of the minimum data size sz_min is suspended. Thus, 30 frames, i.e., 1 second of the compressed image data size is defined as the minimum data size sz_min.

Figure 17:
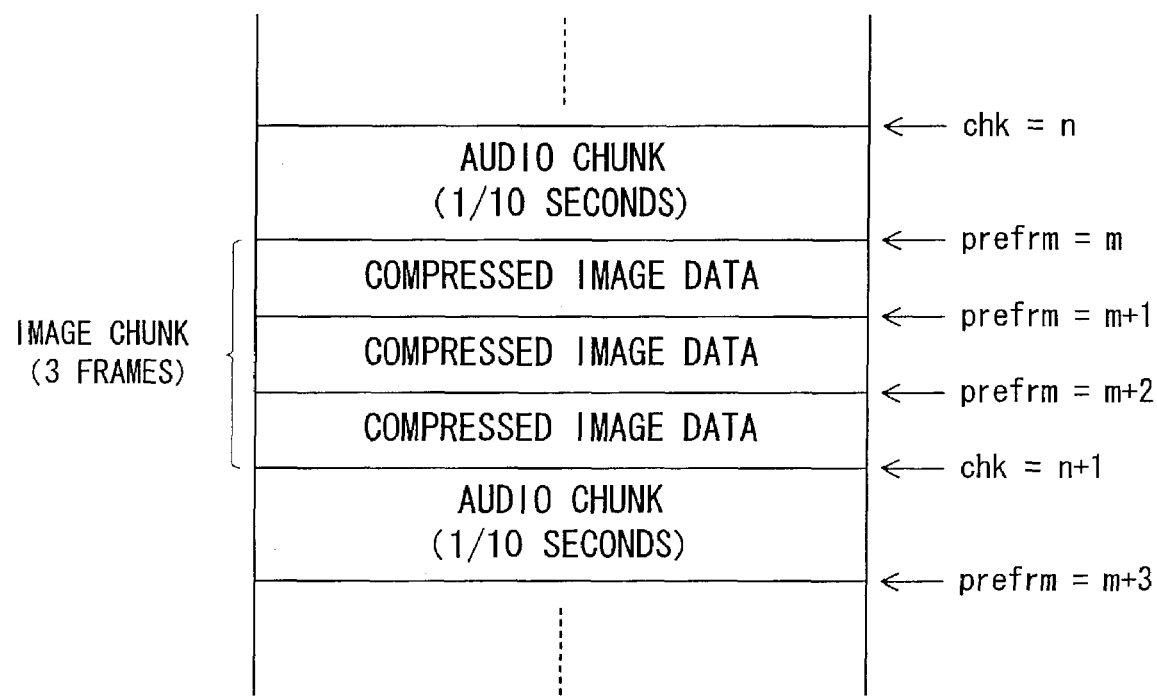
FIG. 17 is an illustrative view showing a part of an operation of FIG. 1 embodiment.

Referring to FIG. 17, the chunk number chk is incremented every time the transfer instruction for 1 chunk of the audio data is set in the instruction list 32c. On the other hand, the writing frame number prefrm is incremented every time the transfer instruction for 1 frame of the compressed image data is set in the instruction list 32c. Therefore, a relationship of before and after between the head address of the noted audio chunk and the head address of the noted frame is inverted every time the transfer setting for the 1 chunk of the audio data is completed or the transfer setting of the 3 frames of the compressed image data is completed. Accordingly, in the instruction list 32c, the transfer instruction for the 1 chunk of the audio data and the transfer instructions for the 3 frames of the compressed data are alternately set in increasing order of the address of the QuickTime file.

Figure 10:
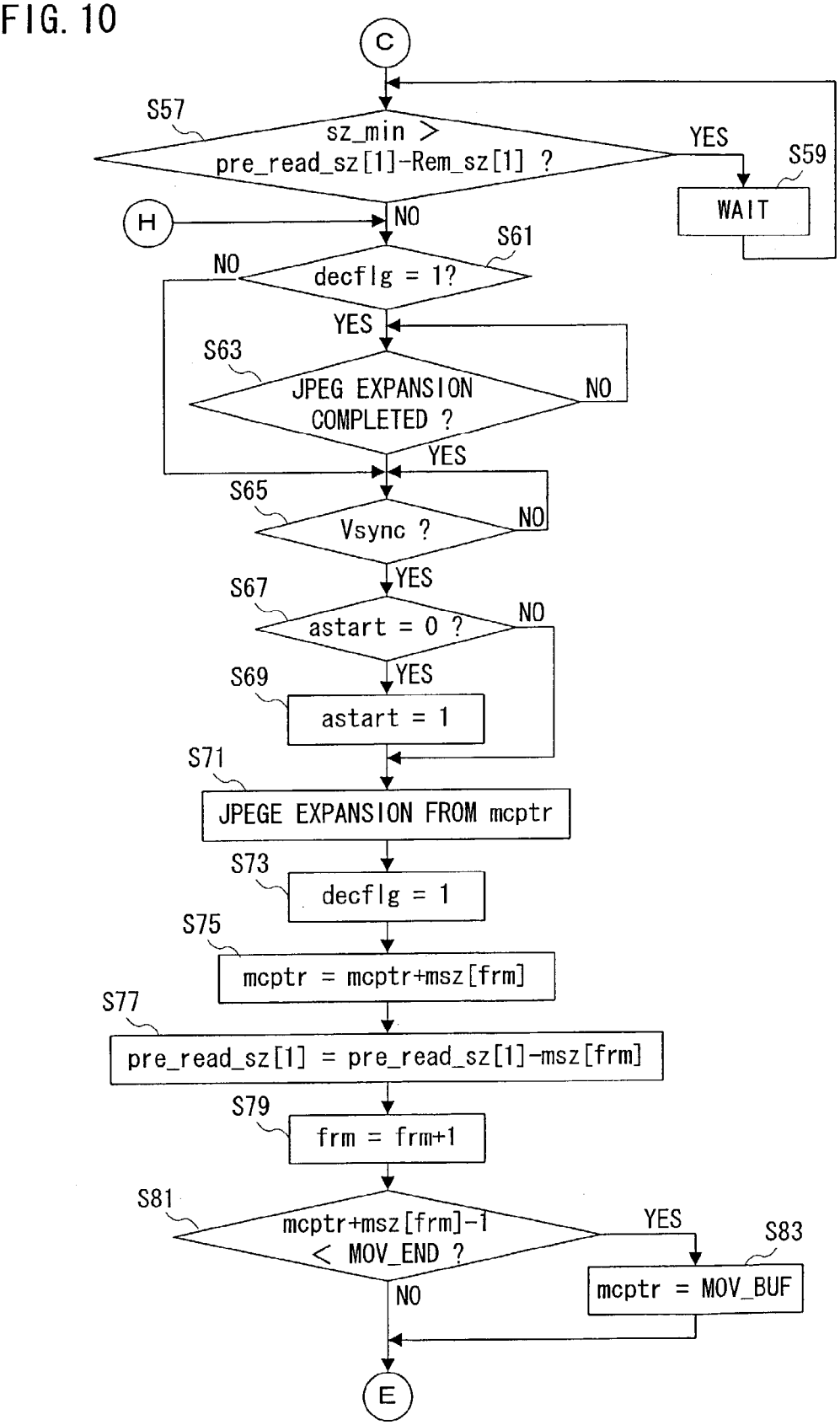
FIG. 10 is a flowchart showing a further part of the operation of FIG. 1 embodiment.
Figure 11:
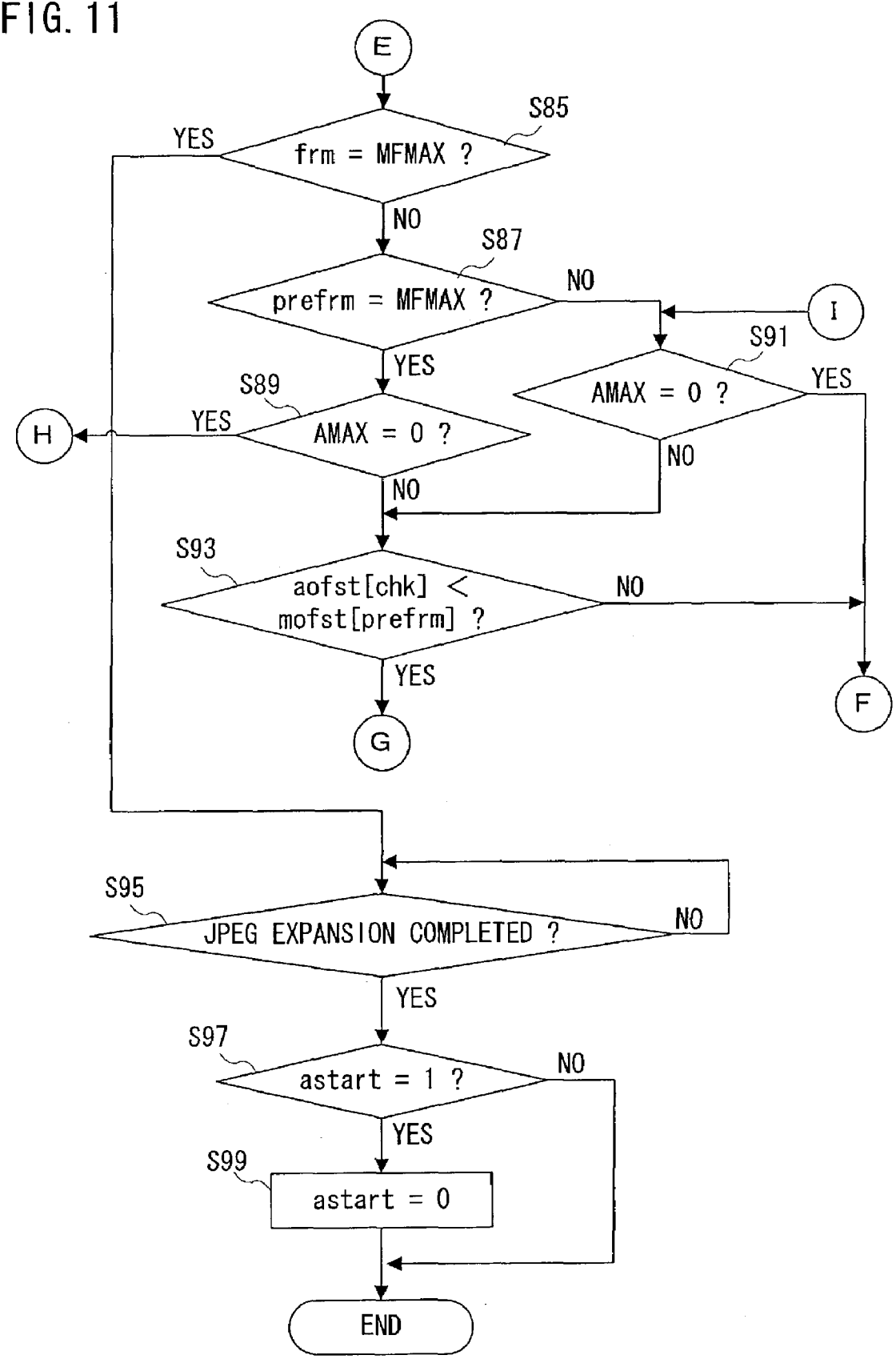
FIG. 11 is a flowchart showing another part of the operation of FIG. 1 embodiment.

It is determined whether or not an equation 6 is established in a step S57 shown in FIG. 10. When the process shifts to the step S57, the unprocessed data size pre_read_sz [1] and the minimum data size sz_min take fixed values. On the other hand, the unprocessed data size Rem_sz [1] decreases every time the transfer instruction is executed by the background process described later.

$$sz\_min>pre\_read\_sz[1]-Rem\_sz[1] \quad \text{(equation 6)}$$

As described above, the unprocessed data size pre_read_sz [1] is a size of the compressed image data for which the transfer instruction to the SDRAM 28 is set to the instruction list 32c and on which the expansion process by the JPEG codec 30 has not yet been performed. On the other hand, the unprocessed data size Rem_sz [1] is a size of the compressed image data for which the transfer instruction to the SDRAM 28 is set to the instruction list 32c and on which writing to the SDRAM 28 has not yet been performed. Accordingly, "pre_read_sz [1]−Rem_sz [1]" is a size of the compressed image data which has been written to the SDRAM 28 and has not yet been subjected to the expansion process by the JPEG codec 30. In the step S57, a relationship of large and small between such the data size and the minimum data size sz_min (=1 second of the compressed image data size) is identified.

When the equation 6 is established, it is considered that a data amount retained in the SDRAM 28 is insufficient, and a predetermined time period is waited in a step S59. Thus, only the background process is performed until the predetermined time period has passed, and whereby, the unprocessed data size Rem_sz [1] is rapidly decreased. When the equation 6 is not established due to the decrease of the unprocessed data size Rem_sz [1], it is considered that the sufficient amount of the data is retained in the SDRAM 28 and then, the process proceeds to the step S61.

It is noted that taking the longest head seek time into account, the minimum data size sz_min is set to a size of 1 second of the compressed image data.

In the step S61, a state of the image expansion permission flag decflg is determined. If decflg=0, the process directly proceeds to a step S65 while if deflg=1, the process proceeds to the step S65 when it is determined 1 frame of the JPEG expansion process has finished in a step S63. It is determined whether or not the vertical synchronization signal generated at every 1/30 seconds is input in the step S65, and in response to a determination result of the presence of an input, the process proceeds to a step S67. In the step S67, a state of the interruption permission flag astart relating to the process of the audio data is determined, and if astart=1, the process directly proceeds to a step S71 while if astart=0, astart is set to "1" in a step S69 and then, the process proceeds to the step S71.

In the step S71, an expansion of 1 frame of the compressed image data which is written to the subsequent image reproducing address mcptr in the compressed image area 28b is instructed to the JPEG codec 30. The JPEG codec 30 performs the expansion process in the above-described manner, and whereby, a corresponding still image is displayed on the monitor 40. In a step S73, the image expansion permission flag decflg is set to "1" so as to obtain a determination result of "YES" in the step S61 at the next time. Succeedingly, the compressed image data size msz [frm] is added to the current image reproducing address mcptr in a step S75, and the compressed image data size msz [frm] is added to the unprocessed data size pre_read_sz [1] in a step S77. The reproducing frame number frm is incremented in a step S79, and it is determined whether or not an equation 7 is established in a step S81.

$$mcptr+msz[frm]-1<MOV\_END \quad \text{(equation 7)}$$

When the equation 7 is established, the compressed image data of the next frame is stored in the renewed image reproducing address mcptr and the subsequent. On the other hand, when the equation 7 is not established, the compressed image data of the next frame is stored in the subsequent head address MOV_BUF of the compressed image area 28b. Therefore, if "YES" is determined in the step S81, the process directly proceeds to a step S85 while if "NO", the head address MOV_BUF is set in the image reproducing address mcptr in a step S83, and then, the process proceeds to the step S85.

The reproducing process of the audio data is performed according to an interruption routine shown in FIG. 15. An interruption process is started in response to a clock of 7990 Hz (audio sampling frequency). First, it is determined whether or not the interruption permission flag astart is "1" in a step S171. Herein, if astart=0, the process is directly restored to the main routine while if astart=1, an audio reproducing instruction is applied to the signal processing circuit 48 in a step S173. The signal processing circuit 48 applies a reading request to the memory control circuit 26 in response to the audio reproducing instruction so as to read 1 byte of the audio data from the audio reproducing address acptr of the audio area 28c. The signal processing circuit 48 further performs a predetermined process on the read audio data and outputs the processed audio signal from the speaker 52. "1" is subtracted from the unprocessed data size pre_read_sz [2] in a step S175, the audio reproducing address acptr is incremented in a step S177 and the renewed audio reproducing address acptr is compared with the end address AUD_END of the audio area 28c in a step S179. Herein, if acptr≦AUD_END, it is considered that the audio data of the next byte is written to the renewed audio reproducing address acptr and then, the process is directly restored to the main routine. On the contrary thereto, if acptr>AUD_END, it is considered that the audio data of the next byte is written to the head address AUD_BUF of the audio area 28c, and the head address AUD_BUF is set in the audio reproducing address acptr in a step S181 and then, the process is restored to the main routine.

Returning to FIG. 11, the current frame number frm is compared with the total number of frames MFMAX in the step S85. If frm=MFMAX, it is considered that the compressed image data of the next frame is not present, the process proceeds to a step S97 when it is determined the expansion process of the current frame of the compressed image data is completed in a step S95. A state of the interruption permission flag astart is determined in the step S97, and if astart=0, the process is directly ended while if astart=1, the interruption permission flag astart is returned to "0" in a step S99 and then, the process is ended.

If "NO" is determined in the step S85, the writing frame number perfrm is compared with the total number of frames MFMAX in a step S87, and if prefrm=MFMAX, it is determined whether or not the total number of bytes AMAX is "0" in a step S89. On the other hand, if prefrm<MFMAX, it is determined whether or not the total number of bytes AMAX is "0"in a step S91. If prefrm=MFMAX and AMAX=0, it is considered setting of the transfer instruction as to all the compressed image data and the audio data has been completed, and the process returns from the step S89 to the step S61. If prefrm=MFMAX but AMAX>0, or if prefrm<MFMAX and AMAX>0, it is considered that data for which the transfer instruction is to be set remains, and the process proceeds from the step S89 or the step S91 to a step S93. In the step S93, the offset aofst [chk] of the current audio chunk is compared with the offset mofst [prefrm] of the compressed image data corresponding to the current writing frame number prefrm, and the process proceeds to a step S101 or S125 depending upon the comparison result. If prefrm<MFMAX but AMAX=0, it is considered that data for which the transfer instruction is to be set is only the compressed image data and then, the process proceeds from the step S91 to the step S125.

It is determined whether or not an equation 8 is established in the step S101.

$$apreptr+asz[chk]-1<AUD\_END \quad \text{(equation 8)}$$

In a case the equation 8 is established, an available capacity enough to write all the audio data belonging to the current audio chunk exists in the current audio writing address apreptr and the subsequent. At this time, the remaining capacity value dm is set to "0" in a step S109, the classification "0", the operation "head seek" and the file address "aosft [chk]" are set in the instruction list 32c in the step S111 and then, the process proceeds to a step S113. On the contrary thereto, when the equation 8 is not established, only a part of the audio data belonging to the current audio chunk can be written to the current audio writing address apretpr and the subsequent. At this time, the classification "0", the operation "head seek", and the file address "aosft [chk]" are set in the instruction list 32c in the step S103. Furthermore, the remaining capacity value dm is required according to an equation 9 in a step S105, and the classification "2", the operation "write", the size "dm" and the SDRAM address "apreptr" are set in the instruction list 32c in the step S107. After completion of the process in the step S107, the process proceeds to the step S113.

$$dm=(AUD\_END-apreptr+1) \quad \text{(equation 9)}$$

The head address "AUD_BUF" of the audio area 28c is set in the audio writing address apreptr in the step S113, the classification "0", the operation "write", the SDRAM address "apreptr" and the size "asz [chk]−dm" are set in the instruction list 32c in the following step S115 and the audio writing address apreptr is renewed according to an equation 10 in a step S117.

$$apreptr=apretpr+asz[chk]-dm \quad \text{(equation 10)}$$

Succeedingly, the size of the current audio chunk asz [chk] is subtracted from the total number of bytes AMAX in a step S119, and the size asz [chk] is added to the unprocessed data size pre_read_sz [2] in a step S121. Thereafter, the chunk number chk is incremented in a step S123 and then, the process returns to the step S91.

Thus, if the available capacity to which 1 chunk of the audio data can be written is present in the audio writing address apreptr and the subsequent, the transfer instruction of the 1 chunk of the audio data is set in the instruction list 32c in the step S115. On the other hand, if the available capacity to which 1 chunk of the audio data can be written is not present in the audio writing address apreptr and the subsequent, the transfer instruction for a part of the audio data is set in the instruction list 32c in the step S107, and the transfer instruction for the other part of the audio data is set in the instruction list 32c in the step S115. After returning from the step S123 to the step S91, the process shifts to the step S125 directly or through the step S93.

It is determined whether or not an equation 11 is established in the step S125.

$$mpreptr+msz[prefrm]-1<MOV\_END \quad \text{(equation 11)}$$

When the equation 11 is established, it is considered that 1 frame of the compressed image data can be written in the current image writing address mpreptr and the subsequent, and then, the process directly proceeds to the step S129. If the equation 11 is not established, the head address MOV_BUF is set in the image writing address mpretpr in a step S127 so as to write 1 frame of the compressed image data in the head address MOV_BUF and the subsequent. The classification "0", the operation "head seek" and the file address "mofset [prefrm]" are set in the instruction list in the step S129, and the classification "1", the operation "write", the SDRAM address "mpreptr" and size "msz [prefrm]" are set in the instruction list 32c in the succeeding step S131. Thereafter, the compressed image data size msz [prefrm] is added to the current image writing address mpreptr in a step S133, the compressed image data size msz [prefrm] is added to the unprocessed data size pre_read_sz [1] in a step S135, and the writing frame number prefrm is incremented in a step S137.

It is determined whether or not an equation 12 is established in a step S139.

$$msz[frm]>pre\_read\_sz[1]-Rem\_sz[1] \quad \text{(equation 12)}$$

As described-above, "pre_read_sz [1]−Rem_sz [1]" is a size of the compressed image data on which the writing to the SDRAM 28 has been completed and on which the expansion process by the JPEG codec 30 has not yet been performed. A relationship of large and small between such the data size and compressed image data size msz [frm] is determined.

When the equation 12 is not established, it is considered that a sufficient amount of the data is retained in the SDRAM 28, and then, the process directly returns to the step S61. On the other hand, when the equation 12 is established, it is considered the data amount retained in the SDRAM 28 in not sufficient and then, the process shifts to a step S141. In the step S141, the interruption permission flag astart is set to "0" so as to suspend reproduction of the audio data, and in a following step S143, a predetermined time period is waited. Thus, only the background process has been executed until a predetermined time period is passed. After a lapse of the predetermined time period, the process in the step S139 is executed again.

By returning to the step S61, the expansion process of the compressed image data is executed again. Furthermore, when the reproducing process of the audio data is suspended, the audio reproducing process is restarted by the process in a step S69.

Figure 12:
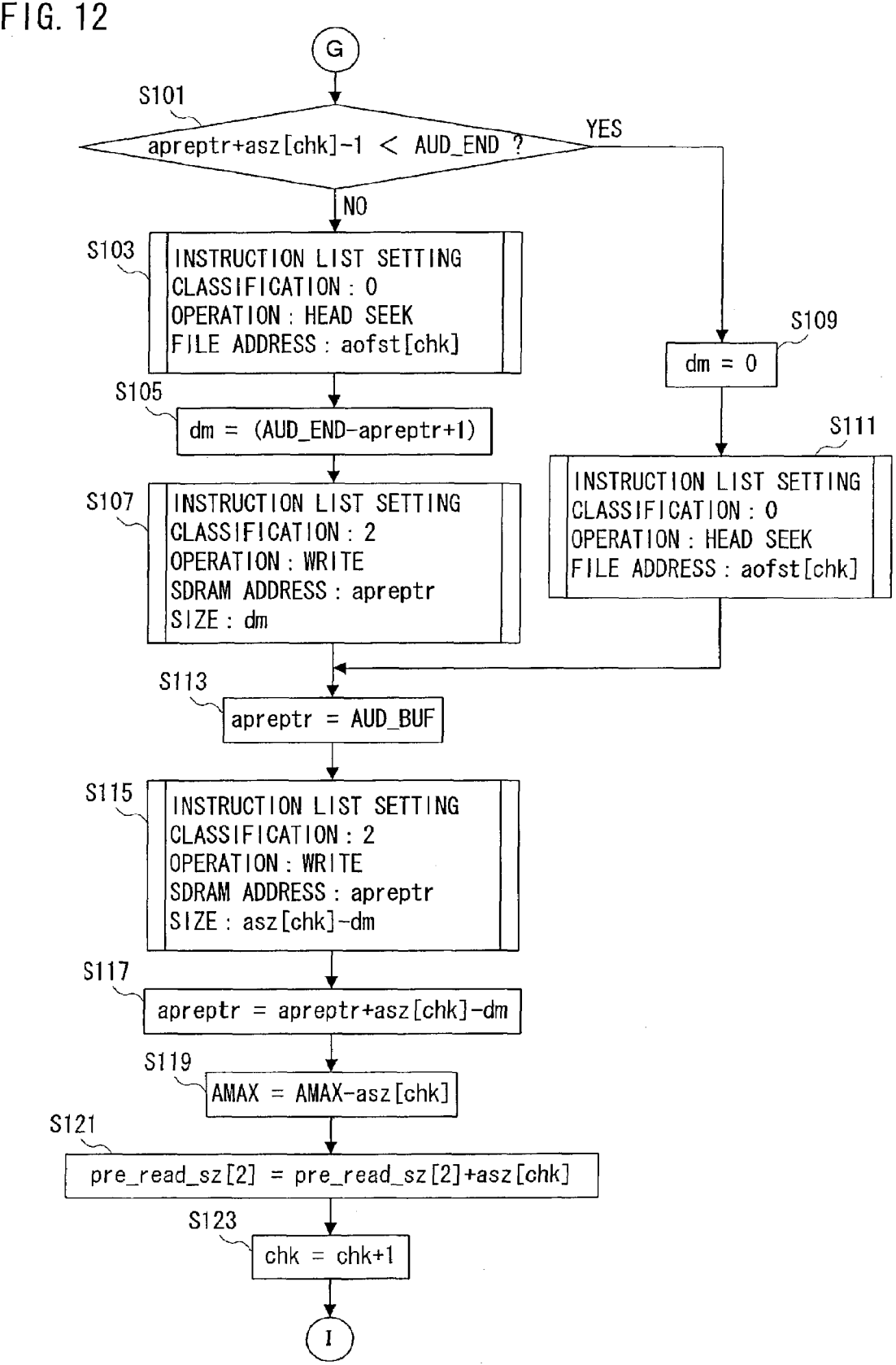
FIG. 12 is a flowchart showing the other part of the operation of FIG. 1 embodiment.
Figure 13:
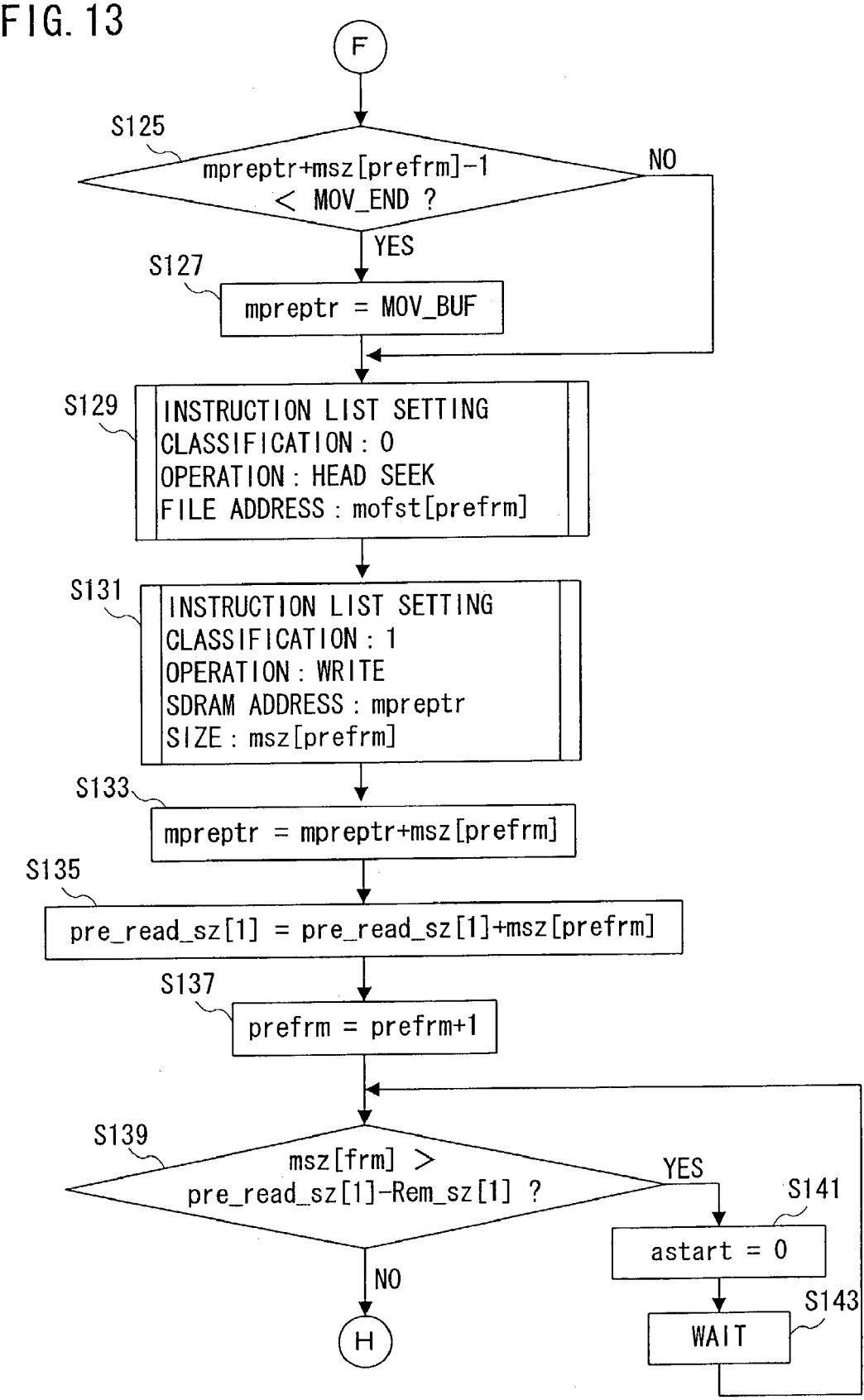
FIG. 13 is a flowchart showing a further part of the operation of FIG. 1 embodiment.

Thus, the transfer setting directed to the 1 chunk of the audio data in the steps S111 and S115 or the steps S103, S107 and S115 shown in FIG. 12 and the transfer setting directed to the 1 frame of the compressed image data in the step S129 and S131 shown in FIG. 13 are performed every time the expansion process of the 1 frame of the compressed image data has been completed. On the other hand, reproducing of the audio data is performed byte by byte in response to the clock of 7990 Hz as long as the interruption permission flag astart indicates "1". Therefore, the transfer instruction set in the instruction list 32c anew is never overwritten to the unprocessed transfer instruction.

The background process is executed according to a flowchart shown in FIG. 16. First, the executing mail number E-mail_No is set to "0" in a step S191, and it is determined whether or not the number of the unprocessed mails Rem_Mail is larger than "0" in a step S193. If "NO" herein, the process in the step S193 is repeated, and at a time of Rem_Mai >0, the process proceeds to a step S195. In the step S195, an instruction of the current executing mail number E-mail_No is executed. That is, if the content of the instruction is "head seek", a desired address within the magneto-optical disk 36 is sought, and if the content of the instruction is "write", desired data is transferred from the magneto-optical disk 36 to the SDRAM 28.

The classification is determined in a step S197, and if the classification is "0", the process directly proceeds to a step S201 while if the classification is "1" or "2", the process proceeds to the step S201 through a step S199. In a case the classification is "1", the size of the transferred compressed image data is subtracted from the unprocessed data size Rem_sz [1] in the step S199. In a case the classification is "2", the size of the transferred audio data is subtracted from the unprocessed data size Rem_sz [2] in the step S199.

The executing mail number E-mail_No is incremented in the step S201, and the number of the unprocessed mails Rem_Mail is decremented in a step S203. It is determined whether or not the executing mail number E-mail_No is reached to the maximum mail number MAX_BOX in a step S205, and if "NO", the process returns to the step S191 while if "YES", the process returns to the step S193.

As understood from the above-description, when the compressed image data recorded on the magneto-optical disk 36 is output via the SDRAM 28, the transfer instruction for the compressed image data is first set in the instruction list 32c (S45, S131). The compressed image data is transferred from the magneto-optical disk 36 to the SDRAM 28 according to the setting of the instruction list 32c (S195). When receiving the compression instruction from the CPU 32 (S71), the JPEG codec 30 reads the compressed image data stored in the SDRAM 28 through the memory control circuit 26 and performs the JPEG expansion on the read compressed image data. The expanded image data is applied to the video encoder 38 via the SDRAM 28 and encoded by the video encoder 38. The encoded composite image signal is applied to the monitor 40, and whereby, a reproduced image is displayed on the monitor 40.

Herein, the size pre_read_sz [1] as to the compressed image data for which the transfer instruction is set in the instruction list 32c and which has not yet been read by the memory control circuit 26, and the size Rem_sz [1] as to the compressed image data for which the transfer instruction is set in the instruction list 32c and which has not yet been transferred to the SDRAM 28 are detected by the CPU32 (S47, S77, S135, S155, S199). When the difference between the sizes pre_read_sz [1] and Rem_sz [1] is below the size msz [frm] as to the compressed image data to be expanded next, the CPU 32 suspends an output of the expansion instruction to the JPEG codec 30 (S143).

The difference between the sizes pre read_sz [1] and Rem_sz [1] becomes a size of the compressed image data which has been transferred to the SDRAM 28 and has not yet been expanded by the JPEG codec 30 (i.e., has not yet been read from the SDRAM 28). By suspending the output of the expansion instruction to the JPEG codec 30 when such the size is below the size msz [frm], it is possible to efficiently use the capacity of the SDRAM 28 and avoid the incident that the writing address is overtaken by the reading address.

Especially, in a case of a disk recording medium such as the magneto-optical disk 36, the seek operation by the magnetic head 34a is required, the transfer is suspended during the seek operation, and therefore, the difference between the sizes pre_read_sz [1] and Rem_sz [1] can be widely changed depending upon a recording state of the compressed image data. In this case, an advantage caused by setting the size msz [frm] as to the compressed image data to be expanded next in a threshold value conspicuously appears.

It is noted that although the magneto-optical disk is utilized as the disk recording medium in the embodiment, a hard disk may be used in place of the magneto-optical disk. Furthermore, although a file according to the QuickTime format is utilized in the embodiment, a file according to an AVI (Audio Video Interleave) format may be used in place of this. In addition, although the frame rate of the motion image in the embodiment is 30 fps, the frame rate is not limited thereto.

Also, although the QuickTime file recorded on the magneto-optical disk is managed in the FAT system, an UDF (Universal Disk Format) system may be used as a file management system.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic camera having a playback mode which outputs data stored in a recording medium via a first buffer memory, comprising:
   a setter for setting a transfer instruction including a file address, a buffer memory address and a data size in an instruction list;
   a transferer for transferring from said recording medium to said first buffer memory data complying with the transfer instruction set in said instruction list;
   a reader for reading the data stored in said first buffer memory by a transfer process of said transferer;
   a first detector for detecting a size of data which is not yet transferred by said transferer out of the data complying with the transfer instruction set in said instruction list;
   a second detector for detecting a size of data which is not yet read by said reader out of the data complying with the transfer instruction set in said instruction list; and
   a disabler for disabling said reader when a difference value which is acquired by subtracting the size detected by said first detector from the size detected by said second detector is below a threshold value.

2. An electronic camera according to claim 1, wherein the data is a plurality of screens of image data, and the threshold value corresponds to a size of image data to be read next by said reader.

3. An electronic camera according to claim 2, wherein said recording medium is a disk medium, and said data output apparatus further comprising a movable reproducing member for reproducing the image data from said disk medium.

4. An electronic camera according to claim 1, wherein the data is a plurality of screens of encoded image data, and said data output apparatus further comprising:
   a decoder for decoding the encoded image data read by said reader;
   a writer for writing decoded image data decoded by said decoder to a second buffer memory; and
   an outputter for outputting to a monitor the decoded image data stored in said second buffer memory.

5. A method for an electronic camera having a playback mode which transfers to a buffer memory data recorded on a recording medium in complying with a transfer instruction set in an instruction list and reads the data stored in said buffer memory, comprising steps of:
   (a) detecting a size of data which is not yet transferred to said buffer memory out of the data complying with the transfer instruction set in said instruction list, the transfer instruction including a file address, a buffer memory address and a data size;
   (b) detecting a size of data which is not yet read from said buffer memory out of the data complying with the transfer instruction set in said instruction list; and
   (c) suspending reading of the data from said buffer memory when a difference value which is acquired by subtracting the size detected by said step (b) from the size detected by said step (b) is below a threshold value.

6. An electronic camera having a playback mode, comprising:
a processor which is installed with a multitask OS; and
a buffer memory which temporarily stores data, wherein
a plurality of tasks executed by said processor includes a first task for transferring data from a recording medium to said buffer memory in complying with a transfer instruction including a file address, a buffer memory address and a data size set in an instruction list and a second task for reading the data stored in said buffer memory, and
said second task includes a suspending process for suspending reading of the data when a difference value acquired by subtracting a first size being a size of data which is not yet subjected to a transfer process out of the data complying with the transfer instruction set in said instruction list from a second size being a size of data which is not yet subjected to a reading process out of the data complying with the transfer instruction set in said instruction list is below a threshold value.

7. An electronic camera according to claim 6, wherein said first task includes a first detecting process for detecting the first size, and said second task includes a second detecting process for detecting the second size.

8. An electronic camera according to claim 6, wherein the data is a plurality of screens of image data, and the threshold value corresponds to a size of image data to be read next by said second task.

9. An electronic camera according to claim 6, wherein said recording medium is a disk medium, and said data output apparatus further comprises a moveable reproducing member for reproducing the image data from said disk medium.

* * * * *